(12) United States Patent
Levin et al.

(10) Patent No.: US 8,512,778 B2
(45) Date of Patent: Aug. 20, 2013

(54) HIGH PROTEIN AND HIGH FIBER FOOD PRODUCTS

(75) Inventors: Raya Levin, Langhorne, PA (US); Kevin W. Lang, Lloyd Neck, NY (US); Gregory B. Murphy, Sands Point, NY (US); James W. Dibble, Port Jefferson, NY (US)

(73) Assignee: Delavau L.L.C., Philadelphia, PA (US)

( * ) Notice: Subject to any disclaimer, the term of this patent is extended or adjusted under 35 U.S.C. 154(b) by 1469 days.

(21) Appl. No.: 11/356,513

(22) Filed: Feb. 17, 2006

(65) Prior Publication Data

US 2006/0141126 A1    Jun. 29, 2006

Related U.S. Application Data

(62) Division of application No. 10/452,026, filed on May 30, 2003, now Pat. No. 7,252,850.

(51) Int. Cl.
*A23L 1/0562*      (2006.01)

(52) U.S. Cl.
USPC ............. 426/99; 426/302; 426/615; 426/653

(58) Field of Classification Search
USPC .................................... 426/99, 302, 615, 653
See application file for complete search history.

(56) References Cited

U.S. PATENT DOCUMENTS

| | | |
|---|---|---|
| 3,023,104 A | 2/1962 | Battista |
| 3,561,974 A | 2/1971 | Hansen |
| 3,615,658 A | 10/1971 | Glabe |
| 3,662,673 A | 5/1972 | Boyer et al. |
| 3,715,104 A | 2/1973 | Cottell |
| 3,767,423 A | 10/1973 | Tsantir et al. |
| 3,767,523 A | 10/1973 | Schwarz |
| 3,883,669 A | 5/1975 | Tsen et al. |
| 3,891,773 A | 6/1975 | Kline et al. |
| 3,925,343 A | 12/1975 | Hampton et al. |
| 3,946,120 A | 3/1976 | Vincent et al. |
| 3,962,480 A | 6/1976 | Wolf et al. |
| 3,979,523 A | 9/1976 | Titcomb et al. |
| 3,987,206 A | 10/1976 | Titcomb et al. |
| 3,995,056 A | 11/1976 | Allais et al. |
| 3,995,065 A | 11/1976 | Titcomb et al. |
| 4,044,155 A | 8/1977 | Hoseney et al. |
| 4,109,018 A | 8/1978 | Thompson |
| 4,111,927 A | 9/1978 | Satterlee |
| 4,159,349 A | 6/1979 | Caiello |
| 4,170,659 A | 10/1979 | Totino et al. |
| 4,181,747 A | 1/1980 | Kickle et al. |
| 4,206,441 A | 6/1980 | Kondo |
| 4,207,345 A | 6/1980 | Van Gheluwe et al. |
| 4,208,441 A | 6/1980 | Westover |
| 4,237,170 A | 12/1980 | Satin |
| 4,241,093 A | 12/1980 | Farag et al. |
| 4,244,980 A | 1/1981 | Fischer et al. |
| 4,248,896 A | 2/1981 | Wallace |
| 4,293,296 A | 10/1981 | Caiello et al. |
| 4,377,601 A | 3/1983 | Dreese et al. |
| 4,393,084 A | 7/1983 | Pomper et al. |
| 4,404,227 A | 9/1983 | Pomper et al. |
| 4,529,609 A | 7/1985 | Gaehring et al. |
| 4,587,126 A | 5/1986 | Patton et al. |
| 4,590,076 A | 5/1986 | Titcomb et al. |
| 4,643,900 A | 2/1987 | Porter |
| 4,645,672 A | 2/1987 | Inoue et al. |
| 4,652,241 A | 3/1987 | McCarty |
| 4,668,519 A | 5/1987 | Dartey et al. |
| 4,678,672 A | 7/1987 | Dartey et al. |
| 4,711,786 A | 12/1987 | Schmidt |
| 4,748,038 A | 5/1988 | Lewis et al. |
| 4,759,934 A | 7/1988 | Ferrara |
| 4,774,098 A | 9/1988 | Gould et al. |
| 4,798,733 A | 1/1989 | Kaneko et al. |
| 4,824,683 A | 4/1989 | Hodgson et al. |
| 4,828,846 A | 5/1989 | Rasco et al. |
| 4,865,869 A | 9/1989 | Tenney et al. |
| 4,871,577 A | 10/1989 | Endo et al. |
| 4,879,133 A | 11/1989 | Endo et al. |
| 4,892,762 A | 1/1990 | Abdelrahman et al. |
| 4,897,350 A | 1/1990 | El-Megeed et al. |
| 4,920,055 A | 4/1990 | Hoiberg et al. |
| 4,938,974 A | 7/1990 | Bichsel et al. |
| 4,961,937 A | 10/1990 | Rudel |
| 4,971,810 A | 11/1990 | Hoyda et al. |
| 4,971,823 A | 11/1990 | Fahlen |
| 5,026,569 A | 6/1991 | Forand |
| 5,035,903 A | 7/1991 | Silva |
| 5,043,171 A | 8/1991 | Bichsel et al. |
| 5,049,398 A | 9/1991 | Saari et al. |
| 5,104,669 A | 4/1992 | Wolke et al. |
| 5,122,380 A | 6/1992 | Tilby |
| 5,133,984 A | 7/1992 | Murphy et al. |
| 5,178,894 A | 1/1993 | Rudel |

(Continued)

FOREIGN PATENT DOCUMENTS

| | | |
|---|---|---|
| BE | 820 950 | 4/1975 |
| BE | 854 941 | 11/1997 |

(Continued)

OTHER PUBLICATIONS

Ronald C. Deis, Ph.D., "Reducing Fat: A Cutting Edge Strategy" published at <<www.foodproductdesign.com>> on Mar. 1, 1997: downloaded from the internet on Dec. 18, 2008.

(Continued)

*Primary Examiner* — Lien T Tran

(74) *Attorney, Agent, or Firm* — Greenberg Traurig LLP; Jonathan D. Ball

(57) ABSTRACT

High protein and high fiber food products, additives for preparing high protein and high fiber food products, and methods of making high protein and high fiber food products are disclosed. More particularly, the additives and methods disclosed are useful for preparing high protein and high fiber bread products. The additives comprise protein and/or fiber, at least one hydrocolloid, oil, and water and may optionally comprise minerals and emulsifiers.

13 Claims, No Drawings

(56) References Cited

U.S. PATENT DOCUMENTS

| | | | |
|---|---|---|---|
| 5,192,564 | A | 3/1993 | Abdelrahman |
| 5,192,569 | A * | 3/1993 | McGinley et al. ............... 426/96 |
| 5,234,827 | A | 8/1993 | Hatfield et al. |
| 5,266,487 | A | 11/1993 | Hatfield |
| 5,275,833 | A | 1/1994 | Schmidt |
| 5,320,859 | A | 6/1994 | Namdari |
| 5,336,515 | A | 8/1994 | Murphy et al. |
| 5,352,473 | A | 10/1994 | Chiqurupati et al. |
| 5,395,623 | A | 3/1995 | Kovach |
| 5,403,610 | A | 4/1995 | Murphy et al. |
| 5,415,804 | A | 5/1995 | Minami et al. |
| 5,433,966 | A | 7/1995 | Wolt et al. |
| 5,439,526 | A | 8/1995 | Czuchajowska et al. |
| 5,441,753 | A | 8/1995 | McGinley et al. |
| 5,458,902 | A | 10/1995 | Rudel |
| 5,477,776 | A | 12/1995 | Shimokubo et al. |
| 5,498,829 | A | 3/1996 | Goertzen et al. |
| 5,624,697 | A | 4/1997 | Lin et al. |
| 5,741,688 | A | 4/1998 | Oxenboll et al. |
| 5,750,360 | A | 5/1998 | Fesus et al. |
| 5,818,045 | A | 10/1998 | Mark et al. |
| 6,117,474 | A | 9/2000 | Kamada et al. |
| 6,123,975 | A | 9/2000 | Ohlin et al. |
| 6,126,982 | A | 10/2000 | Maldonado |
| 6,143,543 | A | 11/2000 | Michelsen et al. |
| 6,210,702 | B1 | 4/2001 | Samman |
| 6,242,033 | B1 | 6/2001 | Sander |
| 6,291,005 | B1 | 9/2001 | Fuchs et al. |
| 6,303,174 | B1 | 10/2001 | McNaught et al. |
| 6,312,741 | B1 | 11/2001 | Navarro |
| 6,322,826 | B2 | 11/2001 | Zohoungbogbo |
| 6,355,283 | B1 | 3/2002 | Yamada et al. |
| 6,399,349 | B1 | 6/2002 | Ryan et al. |
| 6,413,562 | B2 | 7/2002 | Conforti et al. |
| 6,446,547 | B2 | 9/2002 | Kubicko et al. |
| 6,451,367 | B1 | 9/2002 | McNaught et al. |
| 6,451,553 | B1 | 9/2002 | Olsen |
| 6,495,190 | B1 | 12/2002 | Yaginuma et al. |
| 6,495,191 | B1 | 12/2002 | Maldonado |
| 6,562,388 | B2 | 5/2003 | Khan |
| 6,579,546 | B1 | 6/2003 | Jahnke |
| 6,673,383 | B2 * | 1/2004 | Cain et al. ..................... 426/551 |
| 2001/0019734 | A1 | 9/2001 | Gilbertson et al. |
| 2001/0022139 | A1 | 9/2001 | Kubicko et al. |
| 2001/0055641 | A1 | 12/2001 | Conforti et al. |
| 2002/0054948 | A1 | 5/2002 | McNaught et al. |
| 2002/0110630 | A1 | 8/2002 | Khan |
| 2002/0119226 | A1 | 8/2002 | Conforti et al. |

FOREIGN PATENT DOCUMENTS

| | | |
|---|---|---|
| CA | 1048648 | 2/1979 |
| CA | 1102614 | 6/1981 |
| CA | 2007950 | 1/1996 |
| CN | 87103267 | 11/1988 |
| CN | 1208572 | 2/1999 |
| CN | 1366840 | 9/2002 |
| DE | 23 36 562 | 2/1975 |
| DE | 23 51 035 | 4/1975 |
| DE | 26 09 066 | 9/1976 |
| DE | 26 06 546 | 3/1977 |
| DE | 217 976 | 1/1985 |
| DE | 35 04 596 | 8/1986 |
| DE | 260 860 | 10/1986 |
| DE | 42 35 928 | 4/1994 |
| DE | 44 13 951 | 8/1995 |
| JP | 52-117453 | 10/1977 |
| JP | 61-25452 | 2/1986 |
| JP | 61141645 | 6/1986 |
| JP | 5-316925 | 12/1993 |
| JP | 8-191667 | 7/1996 |
| JP | 2000-300157 | 10/2000 |
| JP | 3136291 | 12/2000 |
| JP | 2001-169715 | 8/2001 |
| JP | 2002-17237 | 1/2002 |
| JP | 2002-51748 | 2/2002 |
| KR | 2002-0073620 | 9/2002 |
| RU | 1789165 | 1/1993 |
| RU | 2 084 153 | 7/1997 |
| RU | 2 088 090 | 8/1997 |
| RU | 2 183 406 | 6/2002 |
| SU | 528077 | 10/1976 |
| SU | 577006 | 10/1977 |
| SU | 906482 | 2/1982 |
| SU | 1391565 | 4/1988 |
| SU | 1433975 | 10/1988 |
| WO | WO 91/08673 | 6/1991 |
| WO | WO 91/19421 | 12/1991 |
| WO | WO 94/14342 | 7/1994 |
| WO | WO 95/06412 | 3/1995 |
| WO | WO 95/10332 | 4/1995 |
| WO | WO 95/29996 | 11/1995 |
| WO | WO 96/04798 | 2/1996 |
| WO | WO 96/37109 | 11/1996 |
| WO | WO 01/47362 | 7/2001 |
| WO | WO 02/094123 | 11/2002 |
| WO | WO 03/000071 | 1/2003 |
| ZA | 95 8754 | 10/1996 |

OTHER PUBLICATIONS

JA Casas, et al., "Viscosity of Guar Gum and Xanthan/Guar Gum, Mixture Solutions," *Journal of the Science of Food and Agriculture*, No. 80, pp. 1722-1727 (Online 2000).

* cited by examiner

HIGH PROTEIN AND HIGH FIBER FOOD PRODUCTS

This application is a divisional under 35 U.S.C. §120 of U.S. application Ser. No. 10/452,026, filed May 30, 2003 Now U.S. Pat. No. 7,252,850, the contents of which are hereby incorporated by reference.

FIELD OF INVENTION

The present invention relates to high protein and high fiber food products, additives for preparing high protein and high fiber food products, and methods of making high protein and high fiber food products. More particularly, the present invention relates to high protein and high fiber bread products.

BACKGROUND OF THE INVENTION

Bread and cereal products are the predominate source of nutrition worldwide, supplying important nutrients such as protein, fiber, fats, carbohydrates, and vitamins. In addition to the nutritional advantages of grain based products, it is believed that diets high in grain products may reduce the risk of diseases such as heart disease, stroke, and certain cancers. Despite the dietary advantages of breads and cereals, it has been estimated that only one in ten U.S. consumers eat the USDA's recommended 6 to 11 daily servings of grain-based foods.

Further contributing to the deficiency of grain nutrition in the U.S. is the consumers' preference for certain grain products which have only low to moderate levels of protein and fiber. For example, white breads, which are made from flour having up to 30% of the whole grain removed, constitute the majority of all bread consumed in the U.S. Similarly, consumers in the U.S. and elsewhere are increasingly receiving daily grain intake from snack foods which are high in sugars and starch with only minimal protein and fiber content.

Therefore, it has long been considered desirable to supplement bread products with additional quantities of protein and/or fiber to increase the intake of these nutrients per serving. Traditionally, the amount of additional protein and fiber that may be added to bread dough has been limited. It is widely recognized in the art that bread dough becomes unworkably tough and rubbery or does not properly rise when even small amounts of additional protein and/or fiber are added. The resulting bread products have been described as unacceptably rubbery, chewy, dense or low in volume.

Most bread products are made from wheat flour that has a protein content between 7% and 13%, primarily in the form of vital gluten. After the addition of all other bread ingredients, a typical bread product made from wheat flour has a total gluten content of only about 3-4% by weight. It is well known in the art to add vital gluten to bread flour or dough in order to supplement the protein content of the resulting bread product. However, only relatively small amounts of vital gluten can be added before the dough becomes unworkable.

The rubbery and tough dough characteristic of added vital gluten result from the "knitting" or "development" of the vital gluten upon hydration as it is mixed with water to form dough. Vital gluten knitting has traditionally been considered to arise from disulfide cross-linking between gluten proteins. More recently, it has been discovered that cross-linking of tyrosine residues in wheat gluten proteins may also contribute to gluten development. See Tilley et al, J. Agric. Food Chem. 2001, 49, 2627-2632. The knitting of vital gluten produces the visco-elastic properties characteristic of most bread dough. The elasticity of the dough allows gas bubbles formed by yeast in leavened bread to be retained in the dough. In this manner, vital gluten permits the dough to rise. When additional amounts of vital gluten are added to flour or dough to supplement the protein content, excessive knitting of the protein molecules reduces the elasticity of the dough, resulting in the deleterious effects on the dough and bread properties described above. Due to these limitations, it was heretofore possible to add only about 3-5% by flour weight of additional vital gluten to a leavened bread product. The resulting gluten supplemented bread products contain a total protein content of only about 8% by weight per loaf.

Prior approaches to increasing the protein content of bread products include adding non-fat dry milk (NFDM) to the dough as a source of additional whey protein. See e.g. U.S. Pat. No. 5,458,902 ("Rudel"). The whey proteins in NFDM do not "knit" to the high degree associated with vital gluten allowing for somewhat more workable dough. Breads supplemented with NFDM are reported achieve total protein contents of 20-24% by weight. However, the use of NFDM suffers the disadvantage of introducing dairy ingredients not typically associated with bread products. Such bread products are not acceptable to consumers that have difficulty digesting lactose, are allergic to milk products, or otherwise do not desire breads made with milk products.

Other approaches to increasing protein content in bread have involved denaturing proteins to reduce knitting, diluting flour with large quantities of fiber to offset the added protein, or adding reducing agents to disrupt disulfide bond formation. Typically, vegetable gums must be added in these processes to mimic the moisture and volume of a normal bread product. These approaches have had only limited success in increasing the protein content of bread products and produce breads with commercially unacceptable taste and texture.

Similar limitations on the amount of fiber that can be added to a bread product are well known in the art. Bread products have been supplemented with a variety of dietary fibers such as alpha cellulose, in order to increase the total fiber content. However, the quantity of additional fiber that may be added has heretofore been limited by the unworkable dough and the unacceptable texture and volume of the resulting breads.

Accordingly, there is a continuing need in the art for grain products having high total protein and/or fiber content.

SUMMARY OF THE INVENTION

In accordance with the present invention, high protein and/or fiber breads, bread additives, and processes for making such breads and bread additives are provided.

It has been surprisingly found that grain products such as bread can be enriched in protein and/or fiber to an extent unattainable by prior art practices by the addition of complex compositions comprising protein and/or fiber to flours or dough. When dough is formed incorporating the additive compositions of the present invention, hydration of the added protein or fiber is controlled in a manner so as to provide dough having desirable characteristics and breads products produced from such dough that have a texture and crumb structure comparable breads that do not have added amounts of gluten and/or fiber.

In one aspect of this invention, additives for increasing the protein content of bread products are provided. The protein additives comprise protein, hydrocolloids, and oil and optionally may contain minerals and emulsifiers. Preferred additives according to this invention comprise vital wheat gluten, guar gum, xanthan gum, calcium carbonate, lecithin and canola oil. These additives are processed according to the invention to form a high density complex composition having a vital gluten content of about 85% by weight.

Similarly, additives for increasing the fiber content of bread products are provided. The fiber additives comprise protein, hydrocolloids, and oil and optionally may contain minerals and emulsifiers. Preferred additives according to this invention comprise dietary fiber, guar gum, xanthan gum, calcium carbonate, lecithin and canola oil. These additives are processed according to the invention to form a high density complex composition having a dietary fiber content of about 85% by weight.

The additives of the present invention are compositions of high density, preferably with an average particle diameter so as to pass through a 10 mesh screen.

Another aspect of this invention provides a process for making the protein and fiber additives. The process comprises the steps of mixing the protein and/or fiber, hydrocolloids, minerals, lecithin, oil and water in a mixer capable of creating high shear followed by drying in a convection oven.

In yet another aspect of the invention, bread products are provided which are enriched in protein and/or fiber by the addition of the additives to the baking flour or dough. Any amount of the additives may be added to bread flour depending on the desired protein and/or fiber composition of the final bread product. The additives are employed in a typical bread formulation in an amount ranging from about 0 to about 200% by flour weight. Bread products made according to the invention have protein and/or fiber contents from about 5% to about 50% by weight.

These and other aspects of the invention may be more clearly understood by reference to the following detailed description of the invention and the appended claims.

DETAILED DESCRIPTION OF THE INVENTION

In the following description of the invention, it is to be understood that the terms used have their ordinary and accustomed meanings in the art, unless otherwise specified. All weights referred to herein are given in terms of "% by weight" of the total composition, unless otherwise indicated. The term "% by flour weight" indicates that the ingredient is measured as a percentage of the total weight of flour alone.

1. Additives for Increasing the Protein and/or Fiber Content of Food Products.

One aspect of the present invention provides compositions for increasing the protein content of a food product. As used herein, these compositions are referred to as "protein additives." In the preferred practice of the invention, protein additives are provided for increasing the gluten content of dough and breads produced therefrom.

The protein additives of the present invention comprise proteins, one or more hydrocolloids, oil, and water. The protein additives may optionally contain one or more minerals and a food grade emulsifier, including but not limited to lecithin. Protein additives useful according to the invention may comprise any dietary protein, including but not limited to gluten, soy protein, and whey protein. Gluten is the most preferred protein for use in the protein additives. The protein may be present in the additive composition from about 5 to about 97% by weight. In a preferred embodiment, gluten is present in the protein additive at about 85% by weight.

The protein additives according to the invention may comprise any minerals commonly found in bread products, including but not limited to calcium, copper, manganese, iron, potassium, and selenium minerals. The preferred mineral according to the invention is calcium carbonate. In a preferred embodiment of the invention, the protein additives contain minerals from about 0 to about 50% by weight. In a more preferred embodiment, the protein additives comprise calcium carbonate between about 5 and about 6% by weight.

The hydrocolloid according to the present invention may be any hydrocolloid that is compatible with a food product. Preferred hydrocolloids are selected from vegetable gums, including but not limited to alginates, carrageenan, dextran, furcellaran, pectin, gelatin, gum agar, locust bean gum, gum ghatti, guar gum, gum tragacanth, acacia, gum arabic, xanthan gum, karaya gum, tara gum, cellulose derivatives, starch derivatives, and combinations thereof. Two vegetable gums that have been found to be particularly useful are guar gum and xanthan gum. In one embodiment of the invention, the protein additives comprise a mixture of guar gum and xanthan gum. In this embodiment, the ratio of guar gum to xanthan gum may be any ratio, but is preferably from about 1:4 to about 3:1 by weight. In a more preferred embodiment, the ratio of xanthan to guar is about 1:1 by weight.

The hydrocolloids are preferably present in the protein additive composition from about 0.1 to about 10% by weight, and more preferably from about 0.5 to about 5% by weight. Where more than one hydrocolloid is present in the additive, the sum of the weight of all hydrocolloids is preferably from about 0.1 to about 10% by weight, and more preferably from about 0.5 to about 5% by weight of the total composition. In the most preferred embodiment, the total weight of all hydrocolloids is about 2% by weight of the protein additive composition.

It is contemplated that any oil compatible with a food product will be useful according to the invention. Preferred oils are canola oil, mineral oil, coconut oil, cotton seed oil, rape seed oil, sunflower seed oil, palm oil, and soy oil. Canola oil is the most preferred oil according to the invention. The protein additives of the invention comprise oil from about 0.1 to about 10% by weight, and more preferably from about 2 to about 5% by weight. In one useful embodiment of the invention, the protein additives comprise canola oil in about 3% by weight.

Another embodiment of the invention provides compositions for increasing the fiber content of a food product. As used herein, these compositions are referred to as "fiber additives." In the preferred practice of the invention, the fiber additives are provided for increasing the fiber content of dough and bread products made therefrom.

The fiber additives of the present invention comprise fiber, one or more hydrocolloids, one or more minerals, oil, and water. The fiber additives may optionally contain a food grade surfactant such as lecithin. Preferred fiber additives according to the invention may comprise any source of fiber, including but not limited to soluble and insoluble dietary fiber, wood pulp cellulose, modified cellulose, seed husks, oat hulls, citrus fiber, pea fiber, corn bran, soy polysaccharide, oat bran, wheat bran, barley, and rice bran. The fiber may be present in the fiber additive composition from about 5 to about 97% by weight. In one embodiment, the fiber additive comprises fiber in about 85% by weight. The fiber additives of the present invention comprise the same hydrocolloids, minerals, oil, and water in the same weight ranges as described above in relation to the protein additives.

In addition to the foregoing, it will be understood that the additive compositions according to present invention may comprise both protein and fiber. In this embodiment, the additive comprises protein, fiber, one or more hydrocolloids, one or more minerals, oil, and water. The composition of the additive according to this embodiment is identical to the composition of the protein additives and fiber additive described above, with the exception that protein and fiber are present together in the additive. The ratio of protein to fiber may be any ratio in this embodiment. The additives according to this embodiment comprise a mixture of protein and fiber from about 5 to about 97% by weight. In a preferred embodiment, the additive comprises a mixture protein and fiber in about 85% by weight.

The additives of the present invention have a dense, granular texture. Preferred protein additives according to the invention have a density of between about 0.25 and about 2 gm/cc, and more preferably between about 0.5 and about 1.25 gm/cc. The most preferred protein additives according to the invention have a density of between about 0.5 and about 0.8 gm/cc Preferably, the size of the additive particles will be such that the composition passes through a 10 mesh screen.

2. Method of Increasing the Protein and or Fiber Content of Food Products.

The protein additives and fiber additives may be introduced into a food product in order to increase the protein and/or fiber content of the food product. Accordingly, the invention provides a method of increasing the protein and/or fiber content of a food product comprising incorporating the additive compositions described above into a food product. In the preferred practice of the invention, the protein and fiber additives are employed to increase the protein and/or fiber content of a bread product or food product comprising a bread product.

The additives may be incorporated into the flour or dough used to make bread products. The amount of additive that is added to flour or dough will depend on the desired protein and/or fiber content of the bread product. In the practice of the invention, any amount of additive between about 0 and about 200% by flour weight may be added to flour or dough to produce a high protein and/or high fiber content bread product which has substantially the same taste, texture, crumb structure, and "mouth feel" as a bread product not having added protein or fiber.

It will be understood that the additives of the invention may be used to increase the protein and/or fiber content of any food product. In addition to bread products, the additives may be used to increase the fiber and protein content of any food product.

3. Process for Preparing Protein and Fiber Additives.

The process for preparing the additives of the present invention comprises the steps of (1) mixing the protein and/or fiber, hydrocolloids, oil, water, and optionally additional ingredients such as minerals and emulsifiers in a mixer capable of creating high shear, and (2) drying the resulting composition in a convection drying oven.

A preferred embodiment of the process comprises the steps of (1) mixing protein and/or fiber, hydrocolloids, and optionally emulsifiers and minerals in a mixer capable of creating high shear, (2) adding water to the composition and mixing therewith, (3) adding oil to the composition and mixing therewith, and (4) drying the resulting composition in a convection drying oven. The amounts of protein and/or fiber, hydrocolloids, minerals, and emulsifiers employed are determined according to the weight ratios described above. The amount of water added will preferably be between about 20 to about 40% by weight of the amount of protein and/or fiber. However, the amount of water may be more or less depending on the desired density and texture of the product.

A more preferred embodiment of the process comprises the steps of (1) adding protein and/or fiber, hydrocolloids, minerals, and optionally lecithin to the bowl of a mixer capable of creating high shear in the weight proportions described above, (2) mixing for between about 45 seconds and about 3 minutes at a mixer speeds from about 200 rpm to about 300 rpm, (3) adding to the composition a quantity of water from between about 20 to about 40% by weight of the amount of protein and/or fiber; (4) mixing the composition for about 2 to about 8 minutes, (5) adding oil to the composition, (6) mixing for between about 30 seconds to about 2 minutes, and (6) drying the composition in a convection drying oven.

Examples of convection drying oven include, but are not limited to, tray dryers, vertical fluidized bed ovens, horizontal fluidized bed ovens, spray dryers, and impingement ovens. It has been found useful to adjust the oven conditions so as to yield a final composition having a water content of approximately 8% by weight. In the preferred practice of the invention, the composition is heated to between about 25 to about 80° C. in the oven.

It will be understood that the mixing times described above will vary somewhat depending on factors such as the total quantity of materials to be mixed, the speed of the mixer, and the design of the impeller blades. It is within the skill in the art to optimize the mixing times to achieve the desired texture and density of the resulting composition.

It is contemplated that any mixer which provides high shear may be employed in accordance with the present invention, including but not limited to Hobart mixers and those mixers known in the art as "high shear" mixers.

While many commercially available mixers are integrated with drying options such as vacuum drying, gas-assisted vacuum drying, and microwave drying, the use of these drying features is not recommended in the present invention. To obtain compositions having desirable density and texture for use as bread product additives, the compositions are preferably dried in a convection oven.

4. High Protein and High Fiber Bread Products.

The additive compositions of the present invention are useful for preparing high protein and/or high fiber bread products. Accordingly, this aspect of this invention provides bread products with heretofore-unattainable protein and/or fiber contents. Preferably, bread products according to the invention have substantially the same taste, texture, crumb structure, and "mouth feel" as a bread product not having added protein and/or fiber.

In one aspect of the invention, bread products having increased gluten contents are provided by adding protein additives of the present invention comprising gluten to traditional bread product ingredients. The protein additives comprising gluten may be added in amounts from about 0 to about 200% by flour weight to a bread formulation to produce bread products having increased gluten contents compared to bread made without the additives. According to this aspect of the invention, one embodiment is a bread product comprising gluten in at least 55% by weight. Another embodiment is a bread product comprising gluten in at least 45% by weight. Yet another embodiment is a bread product comprising gluten in at least 35% by weight. Still another embodiment is a bread product comprising gluten in at least 20% by weight. A further embodiment is a bread product comprising gluten in at least 15% by weight.

The protein additives are particularly useful for enhancing the gluten content of bread products that traditionally have had only low to moderate gluten contents such as white breads loaf, buns, and rolls. One useful embodiment of the invention is in the preparation of white breads, buns, and rolls having a gluten content of at least 60% by flour weight, and more preferably 100% by flour weight.

Bread products can also be prepared by adding the fiber additives of the present invention to traditional bread product ingredients in amounts from about 0% to about 200% by flour weight to produce bread products having increased fiber contents compared to breads made without the fiber additives.

One embodiment of the invention is a bread product comprising fiber in at least 55% by weight. Another embodiment is bread product comprising fiber in at least 45% by weight. Yet another embodiment is a bread product comprising fiber in at least 35% by weight. Still another embodiment is a bread product comprising fiber in at least 20% by weight. A further embodiment is a bread product comprising fiber in at least 15% by weight.

The bread products of the invention may be leavened or unleavened bread products. The additives and methods disclosed herein are particularly useful in the preparation of leavened bread products. Any leavening agent known in the art may be employed in practice of the invention.

Bread products according to the invention include, but are not limited to, white bread, wheat bread, tortillas, rolls and buns, specialty/artisan breads, rye bread, whole grain varietals, bagels, pasta, grain-based snack foods, cereals, crackers, cookies, cakes, muffins, pastries, pancakes, pizza crusts, doughnuts, grain-based nutritional supplements, and salty snacks such as pretzels, tortilla chips, corn chips, and potato chips.

The bread products of the present invention may be made using any of the known methods for preparing bread dough, including but not limited to the "straight dough" method, the "sponge and dough" method, the "continuous mixing" method, and the "liquid ferment" method. The sponge dough method is the preferred method employed in commercial bakeries and is the method used in the Examples that follow.

In the sponge and dough method, a quantity of dough, called a "sponge," is prepared which serves as a pre-ferment. The sponge is combined with the balance of bread ingredients at a later stage. In a typical process, the sponge is formed by mixing over half of the flour, most if not all of the yeast, and a quantity of water sufficient to stiffen the dough, for about four minutes in a conventional dough mixer. The sponge is then set to ferment for about three to five hours depending on the amount of flour incorporated into the sponge. The fermented sponge is the mixed with the balance of ingredients in a dough mixer. The resulting dough is then set to ferment for an additional period from about fifteen minutes to one hour before baking. It will be understood that this procedure is merely representative any variations and modifications of this method are contemplated to be with in the skill of the ordinary artisan.

When the sponge and dough method is used, it is preferred to incorporate the additives into the dough rather than the sponge.

Flours useful according to the present invention may contain any amount of protein. Preferred flours are those traditionally used to prepare bread products and preferably have protein in the form of gluten between about 6 and about 18% by weight. Most preferred flours according to the invention are those used to prepare white breads, buns, and rolls. Such flours typically will contain protein in the form of gluten between about 8 to about 11% by weight.

The term "flour" as used herein includes, but is not limited to patent flour, all-purpose flour, bleached flour, bread flour, cake flour, cookie flour, cracker flour, durum flour, enriched flour, farina, graham flour, pastry flour, rice flour, rye flour, self-rising flour, semolina, unbleached flour, wheat flour, whole-wheat flour, wheat meal, corn meal, corn flour, durum flour, rye meal, rye flour, oat meal, oat flour, soy meal, soy flour, sorghum meal, sorghum flour, potato meal, and potato flour. It is contemplated that any flour may be used in the practice of the invention.

While the foregoing description relates to bread products made from flour, the invention is not so limited. "Bread-type" products which do not comprise flour or are substantially free of flour may be prepared according to the present invention. Such bread-type products may be prepared from flour-free dough comprising, for example, gluten and grain. A bread-type product that is "substantially free" of flour will have a flour content of less than about 10% by weight based on total dry ingredients, and preferably will have a flour content of less than about 5% by weight based on total dry ingredients. The protein and/or fiber additives of the invention may be added to these products in amounts from about 1% to about 200% by weight based on total dry ingredients.

5. Theory of the Invention.

While not wishing to be bound by any particular theory, it is believed that the additives of the present invention function to permit the controlled hydration of the protein or fiber contained within the additive.

It is believed that the process for making the high-density additives produces a "complex composition" having some degree of structural order to the particles. The initial mix of protein and/or fiber with a mineral such as calcium carbonate is believed to produce a "core" particle having a density higher than that obtainable with protein and/or fiber alone. An additional degree of compositional structure is believed to be added in the second mixing stage, whereby the core is coated with a mixture of guar gum and xanthan gum. In the final mixing stage, the particles are coated with a layer of oil.

When these additives are incorporated into dough and exposed to water, the outer coating of oil is believed to retard the penetration of water into the particle. As water penetrates the oil layer, the vegetable gums absorb it. It is believed that the water absorbed by the gums slowly penetrates the dense protein and/or fiber "core," initiating hydration at a markedly reduced rate as compared to "free" protein or fiber dispersed within the dough. In the case of the protein additives prepared according to the invention, the controlled hydration achieved by the complex compositions is believed to result in diminished or delayed gluten knitting. It has been surprisingly found that the incorporation of the additives of the present invention into bread dough produces dough with visco-elastic qualities substantially similar to dough that does not have added gluten.

EXAMPLE 1

This example demonstrates the preparation of one bread additive according to the present invention. The ingredients for preparing a representative protein additive are listed in Table I.

TABLE I

| Ingredient | Weight (kg) | % by Weight |
| --- | --- | --- |
| Vital Wheat Gluten | 15.000 | 69.12% |
| Guar Gum | 0.165 | 0.76% |
| Xanthan Gum | 0.165 | 0.76% |
| Calcium Carbonate | 1.000 | 4.61% |
| Lecithin | 0.375 | 1.73% |
| Canola Oil | 0.500 | 2.30% |
| Purified Water | 4.555 | 20.99% |
| Total | 21.705 | 100.00% |

The bowl of a Collette Gral Model 600 high shear mixer was charged with vital wheat gluten, guar gum, xanthan gum, calcium carbonate, and lecithin in the amounts shown in Table I. These ingredients were mixed for 90 seconds at mixer speed from about 200 to about 300 rpm. Purified water was then added to the mixture through a water line. The composition was mixed until the mechanical resistance of the mixture produced a power consumption reading of 25 kW (approximately four minutes). The mixing bowl was lowered in order to evaluate the consistency of the composition. The composition had the desired texture of a light granular mixture that was not clumped together. The mixing bowl was raised and canola oil was sprayed onto the composition using a spray nozzle fed by a line through the head of the mixer. The composition was mixed for one minute.

The mixing bowl was then lowered and the composition was collected in a plastic bag. The composition was then poured through a transition funnel into a vibratory feeder which deposited the charge onto a belt conveyor. The belt conveyor conveyed the composition onto a weigh belt that metered the composition uniformly into a Carrier model QAD/C 1260 S horizontal fluidized bed convection oven. The oven temperature was controlled to produce a product temperature of about 25° C. to about 70° C. The composition exiting the terminal end of the oven had a moisture content of about 8% by weight.

The dry composition was screened using a 10×10 U.S. mesh screen and the particles passing therethrough were collected as a first batch. The oversize particles remaining on the screen were collected and passed through a Crack-U-Lator roll granulator in order to reduce the size of oversized particles. The discharge from the Crack-U-Lator was then passed through a 10 mesh screen and combined with the first batch.

EXAMPLE 2

This Example provides a high protein white bread made using the protein additive of the invention. The bread was made with the sponge and dough technique using the ingredients listed in Table II.

TABLE II

| Ingredient | Sponge[1] | Dough | Total | % by Weight[2] |
|---|---|---|---|---|
| Patent Flour | 60.00 | 25.00 | 85.00 | 32.97% |
| Yeast | 1.88 | 5.00 | 6.88 | 2.67% |
| Water | 55.88 | 22.00 | 77.88 | 30.21% |
| Vital Wheat Gluten | 3.00 | 12.00 | 15.00 | 5.82% |
| Monoglycerides, 90 | | 2.00 | 2.00 | 0.78% |
| Protein Additive[3] | | 50.00 | 50.00 | 19.40% |
| HFCS - 42 DE | | 6.00 | 6.00 | 2.33% |
| Brown Sugar | | 6.00 | 6.00 | 2.33% |
| Whey Protein Isolate - 90% | | 2.50 | 2.50 | 0.97% |
| Soybean Oil | | 4.00 | 4.00 | 1.55% |
| Salt | | 2.50 | 2.50 | 0.97% |
| Asorbic Acid | | 0.03 | 0.03 | 0.01% |
| Total | | | 257.78 | 100.00% |

[1]All weights are provided in kilograms.
[2]% by weight of all listed ingredients.
[3]The protein additive composition described in Example 1.

The high protein white bread prepared in this Example was made from patent flour having a protein content of 11% by weight. The resulting bread contained 10 g of protein for each 50 g serving size. The bread had a texture, crumb structure, taste, and "mouth feel" substantially identical to white bread.

EXAMPLE 3

This Example provides a "light" high protein white bread made using the protein additive of the invention. The bread was made with the sponge and dough technique using the ingredients listed in Table III.

TABLE III

| Ingredient | Sponge[1] | Dough | Total | % by Weight[2] |
|---|---|---|---|---|
| Flour | 77.33 | 310.00 | 387.33 | 27.90% |
| Water | 160.60 | 385.00 | 545.60 | 39.30% |
| HFCS | 4.46 | 17.00 | 21.46 | 1.55% |
| Yeast | 34.70 | 80.00 | 114.70 | 8.26% |
| Salt | 0.99 | 7.40 | 8.39 | 0.60% |
| SSL | 1.50 | 2.40 | 3.90 | 0.28% |
| MCP | 0.42 | 0.00 | 0.42 | 0.03% |
| ADA | 9.4 PPM | | | |
| Ascorbic acid | 24 PPM | | | |
| Whey protein isolate - 90% | | 50.00 | 50.00 | 3.60% |
| Protein Additive[3] | | 150.00 | 150.00 | 10.81% |
| Gluten | | 84.00 | 84.00 | 6.05% |
| Calcium peroxide blend | | 1.20 | 1.20 | 0.09% |
| Fumaric Acid | | 1.40 | 1.40 | 0.10% |
| NFDM | | 6.00 | 6.00 | 0.43% |
| Cal Pro | | 5.00 | 5.00 | 0.36% |
| Baking Powder | | 4.00 | 4.00 | 0.29% |
| Vinegar | | 4.80 | 4.80 | 0.35% |
| Bromate replacer (2 Tablets) | | | | |
| Total | 280.00 | 1108.20 | 1388.20 | 100.00% |

[1]All weights are provided in kilograms unless otherwise indicated.
[2]% by weight of all listed ingredients.
[3]Protein additive composition described in Example 1.

The high protein bread prepared in this Example was made from flour having a protein content of 12% by weight. The resulting bread had a protein content of 10 g for each 50 g serving size. The bread had a texture, crumb structure, taste, and "mouth feel" substantially identical to white bread.

EXAMPLE 4

This Example provides a high protein bun made using the protein additive of the invention. The bun was made with the sponge and dough technique using the ingredients listed in Table IV.

TABLE IV

| Ingredient | Sponge[1] | Dough | Total | % by Weight[2] |
|---|---|---|---|---|
| Flour | 72.30 | 285.00 | 357.30 | 44.60% |
| Water | 116.32 | 118.00 | 234.32 | 29.25% |
| HFCS | 1.44 | 10.00 | 11.44 | 1.43% |
| Yeast | 7.94 | 25.00 | 32.94 | 4.11% |
| Salt | 0.36 | 8.20 | 8.56 | 1.07% |
| SSL | 1.26 | 1.00 | 2.26 | 0.28% |
| MCP | 0.36 | 0.25 | 0.61 | 0.08% |
| Soybean oil | | 8.00 | 8.00 | 1.00% |
| Mono/diglycerides | | 6.00 | 6.00 | 0.75% |
| Protein Additive[3] | | 65.00 | 65.00 | 8.11% |
| Gluten | | 30.00 | 30.00 | 3.74% |
| Calcium Proprionate | | 2.40 | 2.40 | 0.30% |
| Butter | | 16.00 | 16.00 | 2.00% |
| Whey Protein Concentrate | | 26.00 | 26.00 | 3.25% |
| ATT Liquid Tumeric | | 0.30 | 0.30 | 0.04% |
| Bromate replacer | | 4-tablets | | |
| Total | 199.98 | | 801.13 | 100.00% |

[1]All weight are provided in kilograms unless otherwise indicated.
[2]% by weight of all listed ingredients.
[3]Protein additive composition described in Example 1.

The high protein bread prepared in this Example was made from flour having a protein content of 12% by weight. The resulting bread had a protein content of 10 g for each 71 g serving size.

The invention having been described by the forgoing description of the preferred embodiment, it will be understood that the skilled artisan may make modifications and variations of these embodiments without departing from the spirit or scope of the invention as set forth in the following claims.

We claim:

1. A method for increasing the fiber and/or protein content of a food product comprising incorporating a dry additive into said food product in an amount sufficient to increase the protein and/or fiber content of said food product, said additive comprising:
   (a) a solid particle comprising:
      (i) from about 5 to about 97% by weight fiber and/or protein, and
      (ii) from about 0.5 to about 2% by weight of hydrocolloid, said hydrocolloid comprising guar gum and xanthan gum in a weight ratio from about 1:4 to about 3:1; and
   (b) a layer of oil coating said solid particle,
wherein said fiber is selected from the group consisting of wood pulp cellulose, seed husks, oat hulls, citrus fiber, pea fiber, corn bran, soy polysaccharide, oat bran, wheat bran, barley, and rice bran, with the proviso that said fiber is not a modified cellulose.

2. The method of claim 1 wherein said solid particle includes a granular core comprising fiber and/or protein which has been mixed with a mineral to provide a density of the granular core greater than that of the fiber and/or protein alone; and wherein said hydrocolloid forms a coating on said granular core.

3. The method of claim 1 wherein the additive has a moisture content of approximately 8% by weight.

4. The method of claim 1 wherein said food product is a bread product.

5. The method of claim 1 wherein said protein is gluten.

6. The method of claim 1 wherein the weight ratio of guar gum to xanthan gum is about 1:1.

7. The method of claim 1 wherein the oil is canola oil.

8. The method of claim 1 wherein the additive further comprises a mineral.

9. The method of claim 8 wherein the mineral is calcium carbonate.

10. The method of claim 1 wherein the additive further comprises an emulsifier.

11. The method of claim 10 wherein the emulsifier is lecithin.

12. The method of claim 1 wherein said fiber and/or protein comprises from about 70 to about 90% by weight of the additive.

13. The method of claim 12 wherein said fiber and/or protein comprises about 85% by weight of the additive.

* * * * *